United States Patent [19]

Vachon

[11] 4,446,925
[45] May 8, 1984

[54] SOIL CULTIVATING MACHINE

[75] Inventor: Bertrand Vachon, Thetford Mines, Canada

[73] Assignee: Ber-Vac Inc., Quebec, Canada

[21] Appl. No.: 339,781

[22] Filed: Jan. 15, 1982

[51] Int. Cl.³ .................. A01B 35/18; A01B 63/22
[52] U.S. Cl. ................................ 172/142; 172/149; 172/199; 172/413
[58] Field of Search ............... 172/142, 147, 149, 198, 172/199, 197, 413, 780, 799.5, 833, 466

[56] References Cited

U.S. PATENT DOCUMENTS

| | | | |
|---|---|---|---|
| 2,593,176 | 4/1952 | Patterson | 172/466 X |
| 3,643,745 | 2/1972 | Betulius | 172/413 |
| 3,935,906 | 2/1976 | Neal | 172/700 |
| 4,361,191 | 11/1982 | Landoll | 172/198 |

OTHER PUBLICATIONS

Mix-N-Till Advertizing Brochure of Lear Siegler Inc. Sac City IA 1981.
S-Tine Cultivator-Incorporator-Advertizing Brochure of Brillion Ironworks, Brillion WI.
Ber-Vac Advertizing Brochure of Ber-Vac Inc. Thetfordmines Que. Can. 1/79.
Glencoe Danish Shankfield Cult with Double Rolling Baskets Adv. Brochure of Portable Elv. Bloomington, IL.
Soil Preparation with the Triple K. System-Advertizing Brochure of Kongskilde-USA Branch Memphis, TN.
Mix'N' Till Seed Bed Finisher-Advertizing Brochure of Noble-Sac City IA.

Primary Examiner—Richard J. Johnson
Attorney, Agent, or Firm—Steele, Gould & Fried

[57] ABSTRACT

An agricultural apparatus and more specifically a cultivator intended to till the soil for the incorporation of chemical solutions and to prepare it for sowing. This cultivator has a double-wheel-mounted frame capable of being hitched to a tractor, at least one transverse row of tines at the front or drawing end and at least one additional transverse row of the tines at the rear. A single or double transverse cylindrical rolling harrow, spring-pressed downwardly and oscillating vertically, is provided behind the rear tines, the harrow having a churning action which breaks up the lumps left after the soil has been loosened by the tines. A further transverse rolling harrow is also provided between the front and rear rows of tines, generally at the center of the frame. This additional harrow is, like the rear one, pressed downwardly by springs and is also able to oscillate vertically. To ensure positive control of the depth into which the tines and harrows may be allowed to work, a mechanical stop may be provided for stopping the fall of the frame and its appended tilling equipment past a predetermined level with respect to the whells, thereby ensuring that the cultivation depth is kept constant regardless of any leak that may develop in the hydraulic system of the power jacks.

13 Claims, 8 Drawing Figures

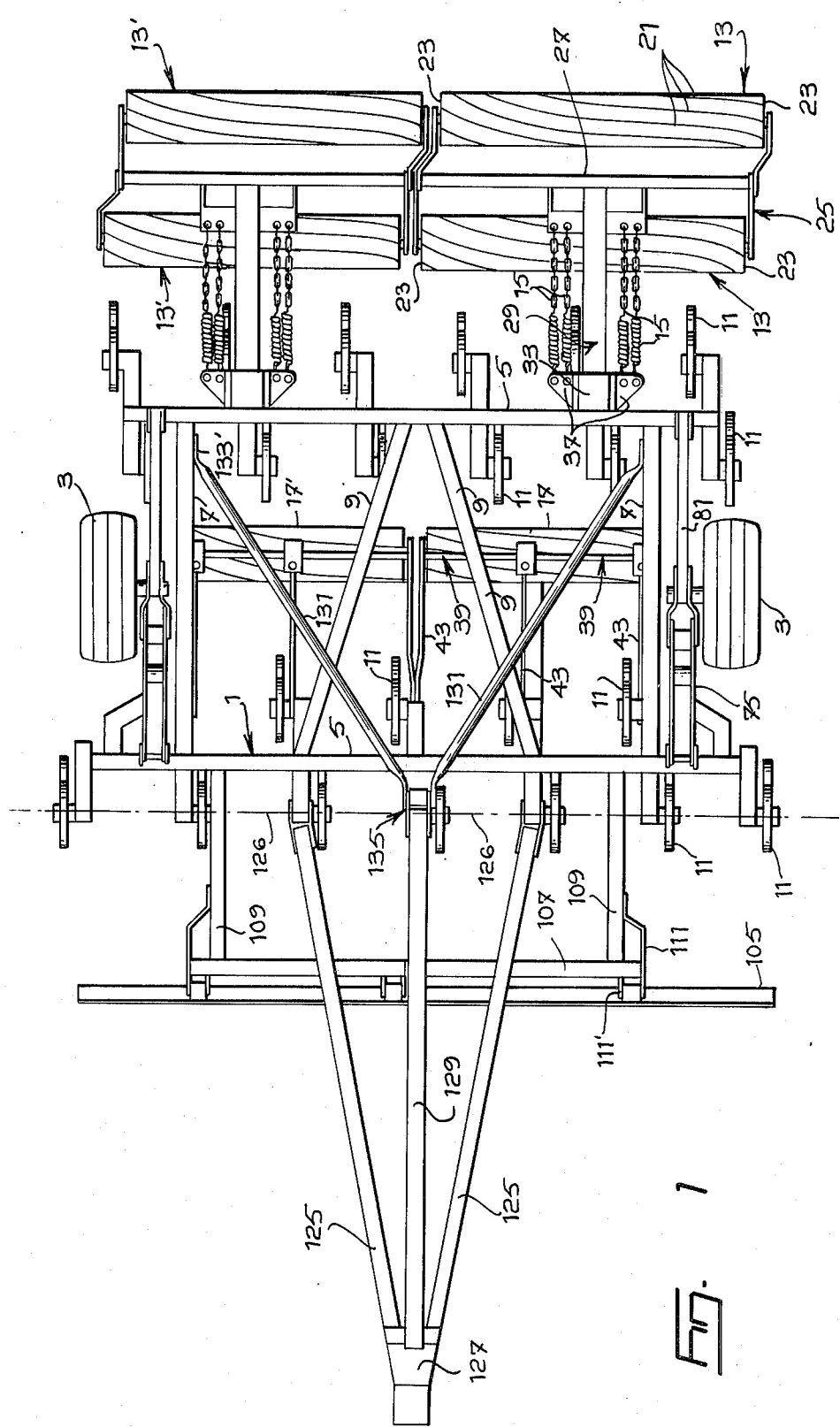

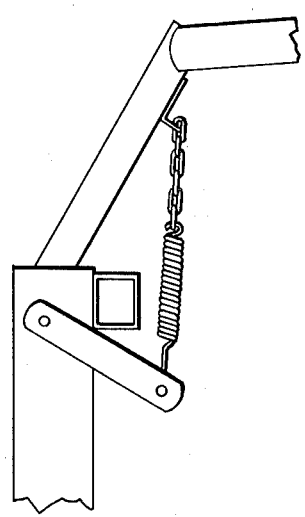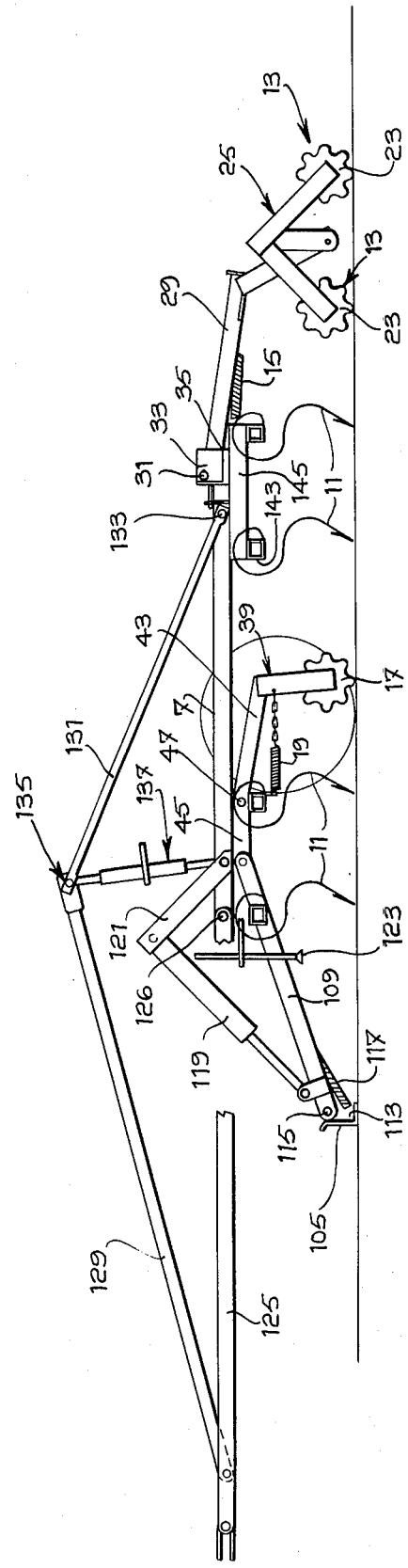

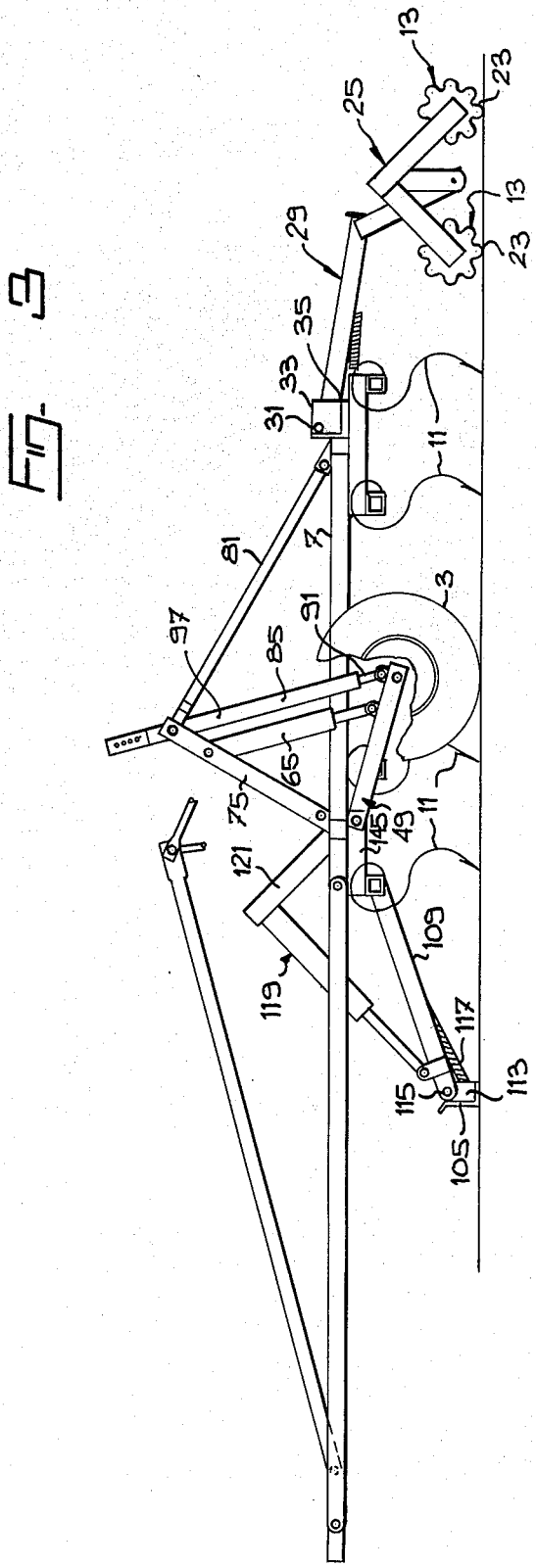

SOIL CULTIVATING MACHINE

The present invention relates to an agricultural machine and more specifically to a cultivator intended to till the soil for the incorporation of chemical solutions and to prepare it for sowing.

The cultivator of the invention is of the type generally having a double-wheel-mounted frame capable of being hitched to a tractor and having at least one transverse row of tines at the front or drawing end and at least one additional transverse row of the tines at the rear. A single or double transverse cylindrical rolling harrow, spring-pressed downwardly and oscillating vertically, is provided behind the rear tines, the harrow or harrows having a churning action which breaks up the lumps left after the soil has been loosened by the tines.

While the above cultivator has been found satisfactory, it is usually necessary that a second pass be made over the soil if adequate tillage is to be obtained because the first pass does not sufficiently loosen and churn the soil and generally adequately prepare it for sowing in a single pass. It will easily be appreciated that such a second pass is quite time-consuming and therefore expensive in manpower, let alone the cost of the tractor operation, particularly the rising price of the fuel energizing the tractor motor.

A major and basic object of my invention is therefor to improve the above cultivator in such a way as to avoid the necessity of the aforementioned second pass. I have indeed found that this object can surprisingly be obtained simply by adding a further transverse rolling harrow right in between the front and rear rows of tines, generally at the center of the frame, this additional harrow being, like the rear one, pressed downwardly by springs or other resilient means and being also able to oscillate vertically. The addition of another rolling harrow thus gives two successive arrangements of at least one row of tines and of one rolling harrow and I have found that the resulting tillage gives an incorporation of chemical products in the soil which is more accurate, uniform and homogenous, further providing a perfect seed bed because the action of the rolling harrows, one between the rows of tines and the other or others rearwardly of the rear tines, finally break the soil lumps, pack up and close up the soil at the surface whereby to retain moisture, preventing formation of surface crust and erosion. It seems therefore that the addition of this rolling harrow between the front and rear tines is responsible for providing such a thorough tillage of the soil, rendering the latter ready to receive seeds without a second pass being necessary.

Thus, in accordance with the broad concept of the invention, there is provided and claimed herein a cultivator of the type including: a frame and means mounting the frame on a single or dual pair of wheels rotatable about an axis extending transversely of the frame with respect to the direction of displacement of the cultivator, the frame having a drawing end and a rear end; at least one transverse row of tines forwardly of the wheel axis and at least one other transverse row of tines rearwardly thereof; means mounting the tines on the frame; at least one transverse cylindrical rolling harrow; means mounting the rolling harrow on the frame at the rear end thereof, behind the rear one of the rows of tines, for oscillation of the rear harrow about an axis parallel to the longitudinal axis of the rear harrow, and means resiliently biasing the rear harrow downwardly. The cultivator of my invention is characterized by the combination therewith comprising: at least one additional transverse cylindrical rolling harrow; means mounting the additional harrow on the frame, between the forward and rearward rows of tines, for vertical oscillation about an axis parallel to the longitudinal axis of the additional harrow, and means resiliently biasing the additional harrow downwardly.

In a preferred embodiment of the invention, two rows of tines are provided at the front and two rows at the rear with the rolling harrow being provided in between the front and rear tines. I have observed that the trash (weeds and others) accumulating in the front rows of tines is grasped by the additional rolling harrow. The action of the latter is to tear, shred and rip the trash into smaller and smaller parts, the process being continued as the trash passes thereafter between the rear rows of tines and the rear rolling harrow. The trash which is thus left on the surface aids in minimizing wind erosion damage.

Another disadvantage which I find in the present day cultivators is that they are not provided with adequate and precise cultivation depth control, if at all. This may be one of the reasons for needing a second tillage pass.

Now, proper cultivation requires that tillage be achieved only to the seed planting depth so as to allow the seeds to be located adjacent the level of the soil where the moisture remains undisturbed. This location of the seeds stimulates quicker germination, higher plant population and healthier plants more capable of establishing a sound root structure even under dry or drought conditions. Small grains experiencing severe drought conditions have been observed to stay green for up to seven days longer when they are planted in a seed bed in the above manner, that is close to the moist undisturbed soil. The yield at the end of the season has been known to be 50% higher, when it has been possible to seed in this manner. It will be appreciated that this requires a positive control of the depth into which the tines and rolling harrows may be allowed to work.

To achieve the above cultivation control, known cultivators of the above type have a frame which is mounted on the wheels by suspensions allowing, by means of extendable hydraulic power jacks, the frame and its equipment to be pressed down against the soil. In operation, the pressure applied by the power jacks against the wheels is made to depend on the depth of cultivation desired. I have noted however that the present cultivators do not provide any safe ways of ensuring proper control over the hydraulic pressure of the jacks so that if there is a pressure fluid leak in the hydraulic system, the frame and its equipment drop, thereby increasing the depth of cultivation, particularly of the tines.

I have found a very positive way of avoiding the above drawback by providing a mechanical means of stopping the fall of the frame and its appended tilling equipment past a predetermined level with respect to the wheels thereby ensuring that the cultivation depth is kept constant regardless of any leak that may develop in the hydraulic system of the power jacks.

More specifically, and in accordance with a preferred form of the invention claimed herein, the cultivator frame is made up of a pair of parallel cross-members disposed on either side of the axis of the wheels and has longitudinal members that join the cross-members, the means that mount the frame on the wheels comprising, along either side of the frame: a wheel leg which is pivotally mounted at one end on the frame for oscillation beneath the frame and in a vertical plane, and axle means at the other end on which one of the wheels is mounted for free rotation about its axis; a pair of braces interconnected at one end and connected at the other end respectively to one of the cross-members so as to form a vertical triangular structure, and a power jack interconnecting one of the braces and the wheel leg, jack which is suitable to cause oscillation of the leg and thus relative displacement of the frame and wheel. According to this preferred embodiment and in order to ensure proper control of the cultivation depth, there is provided additionally an upwardly standing telescoping assembly which comprises: a hollow tubular member with a rod freely slidable therein; the hollow member having, at one end, a series of holes therethrough which are spaced in pairs therealong and a lock pin removably extending through a selected one of the pairs of holes to prevent the rod from sliding in the member, upwardly past the lock pin. The upper end of the hollow member is connected at the apex of the triangular structure while the lower end of the rod is connected to the wheel leg away from its pivot end. In this manner, upon release of pressure in the power jack and consequent lowering of the frame, the rod rises in the hollow member until it butts against the lock pin and prevents further downward movement of the frame. A positive way of controlling the depth of tillage is thus obtained.

Usefully and advantageously, the telescoping assembly of each wheel may comprise additional pairs of safety holes through the hollow member, safety holes that are disposed at a distance from the first-mentioned pairs of holes, away from the apex. These additional safety holes are useful to prevent falling of the frame, below a predetermined point, when the said frame is raised relative to the wheels, for displacement of the cultivator on roads. It is thus to be understood that the tines and rolling harrows are, when the frame is at the predetermined point above-mentioned, in inactive raised position.

I have also noted that, in cultivators of the above-known type, as the cultivator is being pulled by the tractor, the forward tines tend to dig into the ground more forcefully than the following ones so that the frame tilts forwardly thereby causing so the rear tines and harrows to till the soil at increasingly shallower depth. Again, this situation may be one of the reasons why a second tillage pass is necessary. It is therefore in accordance with a preferred feature of my invention to provide a cultivator having a system that keeps the frame appreciably level from front to rear so as to retain a depth of cultivation which may be more constant from front to rear.

More specifically, a preferred form of the cultivator of my invention further includes a frame levelling system which comprises: a draw bar arrangement for connection, at one end, to a tractor hitch device and pivotally connected, at the other end, to the drawing end of the frame; a tetrahedron structure rising above the draw bar arrangement and the frame, the structure having a front rod connected at one end to the one end of the draw bar arrangement, a pair of rear rods connected at one of their ends to points on the frame rear end that are transversely spaced apart, and means connecting the other ends of the front and rear rods together to form the apex of the tetrahedron, and jack means connected between the apex of the tetrahedron and the forward end of the frame whereby displacement of the apex with respect to the frame by the jack means causes relevant displacement of the rear end of the frame with respect to the frame drawing end.

Conveniently also, and in accordance with yet another form of the invention, there is additionally provided a transverse soil levelling blade attached to the drawing end of the frame, the attachment including resilient means allowing the blade ground-contacting edge to tilt backward so as to be able to clear obstacles. The attachment also includes a hydraulic or mechanical power jack which lowers and raises the blade to active and inactive positions. This blade of course levels the ground and fills in holes in it. This permits a saving in herbicide and fertilizer solutions.

With the above levelling blade arrangement, the system for spraying chemical solutions may advantageously be provided immediately forwardly of the forward row of tines and behind the levelling blade.

In order to provide powerful loosening action of the top soil, prior to and after the center rolling harrow, the cultivator of the invention preferably uses vibrating tines of the S-shaped type as will hereinafter be more fully described. Their use, with the rolling harrows, ensures thorough incorporation of the chemical solutions in the soil. The vibrating S-shaped tines mix the solution laterally in the soil while the rolling harrows tend to blend them vertically.

A better understanding of the invention will now be had by the following description of a preferred embodiment having reference to the appended drawings wherein:

FIG. 1 is a top plan view of the hereinafter described embodiment;

FIG. 2 is an elevation view, partly broken away, intended particularly to illustrate both the central harrow feature and the rear to front levelling system;

FIG. 3 is a second elevation view more particularly intended to illustrate the telescoping assembly intended to control the depth of cultivation;

FIG. 5 is a perspective view, broken away, of an S-shaped tine and part of the frame to which it is mounted;

Figure 4:
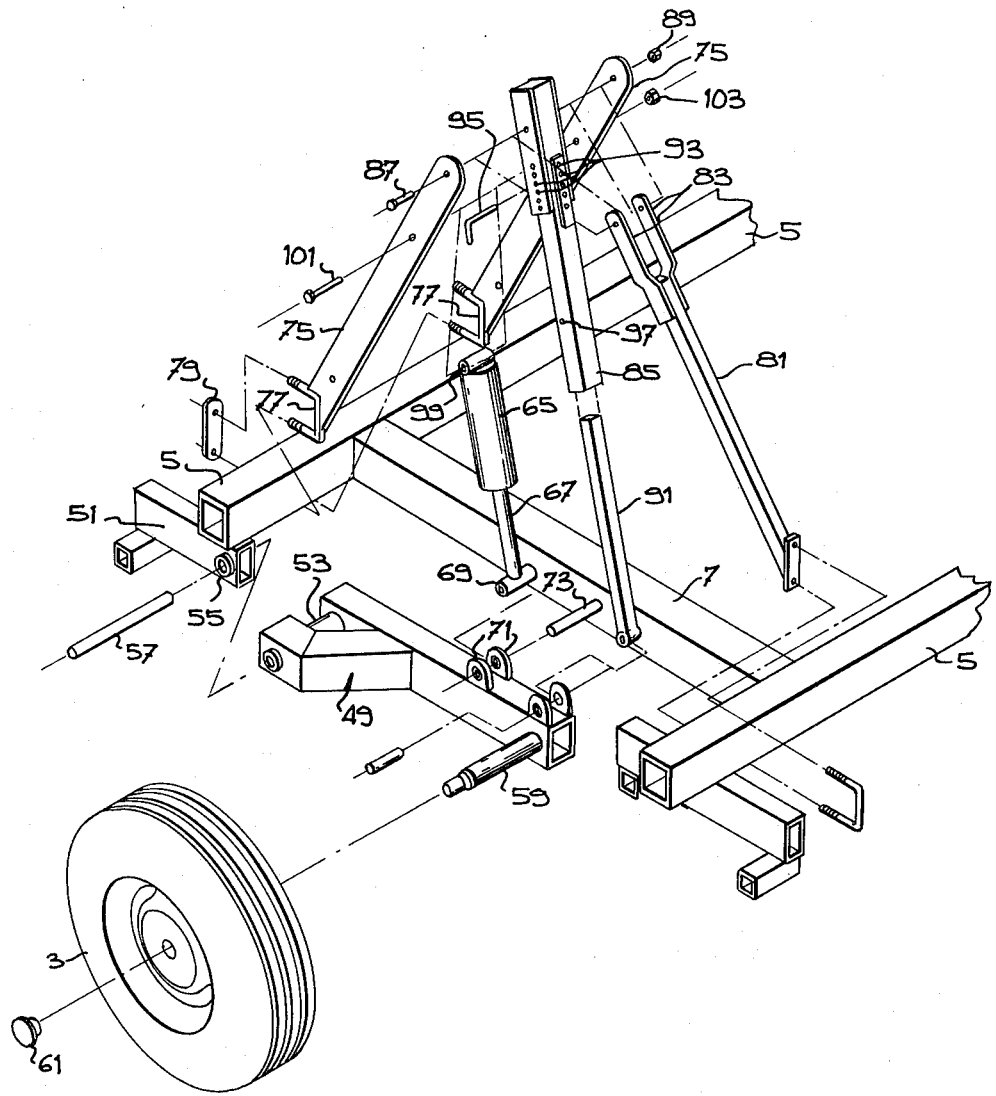
FIG. 4 is a partial view, in perspective and broken away, intended to illustrate both the cultivation depth control telescoping assembly and the wheel mounting assembly.
Figure 6:
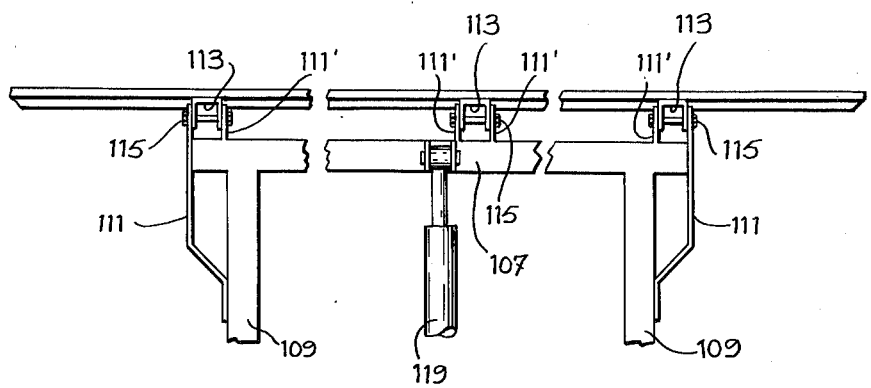
FIGS. 6 and 7 are, respectively, partial plan and side elevation views of the levelling blade arrangement.

Referring to the drawings, where the like reference numerals refer to the same elements, there is shown a cultivator made according to the teachings of the present invention which incorporates a frame 1 mounted on a single pair of wheels 3, each mounted for rotation about its own axis extending across the frame 1, in a manner to be hereinafter more fully described. By transverse, in this specification, is to be meant of course a direction perpendicular to the direction of displacement of the cultivator.

Basically, the frame 1 is made up of two transverse members 5 interconnected by two longitudinal members 7 and two diagonal members 9. One transverse member 5 is located at the drawing end of the frame, that is the end of the frame used for pulling the cultivator, and the other transverse member 5 is at the rear end of the frame.

Two transverse rows of tines 11 are provided at the drawing end of the frame 1 while two additional rows of tines 11 are provided at the rear end, being connected thereto in a manner fully to be described hereinafter. Suffice it to say, for the moment, that two rows are provided on either side of the axes of the wheels 3.

A pair of transverse cylindrical freely-oscillating harrows 13 are provided behind the rear tines 11 for oscillation about an axis which is parallel to the longitudinal axes of the harrows so that the latter are able to pivot in a vertical plane. In the case of a larger cultivator, additional harrows, may be provided end-to-end, the two pairs being independent of one another. However, since their construction is the same, reference will be made hereinafter to a single pair.

The harrows 13 and their mounting means on the frame 1 are well known and will be described briefly.

Each harrow 13 is made up of a series of spiral blades 21 secured along their lower edges on the periphery of a series of vertical cheek plates 23, of which only the end ones are shown, spaced along and onto a longitudinal axle (not shown) of which the ends project beyond the end cheek plates 23. This assembly forms the previously mentioned rolling harrow 13. Two such harrows are mounted at the downward ends of the two sides of angular terminal supports 25 which are interconnected, at the apex thereof, by a connecting bar 27 which is secured, centrally thereof, to one end of an arm 29 of which the other end is pivoted, as at 31, inside a box housing 33. It will be noted that the pivot 31 is located inside and upwardly of the box housing 33 so that the lower frontal edge 35 of the housing 33 may serve as a stop for the oscillating arm 29 to prevent downward fall of the harrows 13 past a predetermined level.

The aforementioned spring assembly intended to press the harrows 13 down against the soil is best illustrated in FIG. 1 where it consists of a plurality of springs connected, at one end, to wings 37 laterally projecting from the box housing 33 and connected, at the other end, to one end of chains or any other means of attachment whose other ends are removably secured to the rear end of the oscillating arm 29. Thus, the strength of the spring assembly 15 may be varied by having different links of the said chains secured to the rear end of the oscillating arm 29, the removable mounting of the various links of the chains being achieved in any known manner.

The additional central rolling harrow assembly which, as mentioned above, constitutes the basic concept of the present invention, is shown like the rear harrow 13 as made up of two harrow sections 17, 17' extending end-to-end, transversely of the frame 1. The mounting of the two harrow sections 17, 17' on the frame 1 being identical, one only need be described here and it will be noted that the mounting is, in fact, essentially the same as that for the rear harrows 13. Likewise, wherein each central harrow assembly is shown to include only one rolling harrow 17, it may be of the double type like the rear harrow assembly 13.

The central transverse cylindrical rolling harrow 17 is exactly of the same type as one rear harrow 13, that is made up of a plurality of longitudinally spirally wound blades 21 connected at their ends to and around cheek plates 23 and to the periphery of a certain number of cheek plates (not shown) between the cheek plates 23. The cheek plates 23 as well as the intermediate cheek plates are mounted on an axle rotatably journalled to the lower ends of an inverted U-shaped harrow support 39. The latter is mounted on the frame 1 by means of three arms 43, one at either end of the support 41 and one at its center. One end of each arm 43 is secured to the top of the harrow support 39 while the other end is received within a hollow square bar 45 where it is pivotally mounted at 47. Bars 45 themselves are secured to the frame forward transverse member 5, transversely thereof. A strength adjustable spring and chain assembly 19, similar to spring and chain assembly 15, biases the central harrow 17 against the ground. The downward movement produced by the spring and chain assembly 19 is stopped when the oscillating arms 43 butt against the lower edges of the hollow bars 45.

Thus, and in accordance with the invention, the central rolling harrows are mounted on the frame between the forward and rearward rows of tines 11 for vertical oscillation about an axis 47 which is parallel to the longitudinal axis of these additional harrows 17, the harrows 17 being biased downwardly by the spring assemblies 19 until, as aforesaid, the oscillating arms 43 are stopped in their downward movement when they hit the lower edge of their respective hollow bar 45.

Each of the two or more wheels 3 of the cultivator is mounted on the frame 1 by a suspension which is illustrated in FIGS. 3 and 4.

This assembly comprises a wheel leg 49 pivotally mounted, at one end, to a square bar 51 itself fixed beneath the transverse member 5 of the frame 1. In the installation of FIG. 4, one end of the wheel leg 49 branches out into a fork having a transverse bearing sleeve 53 which is aligned with a similar bearing sleeve 55 of the square bar 51, secured to and beneath the transverse member 5 of the frame 1. A pivot pin 57 is then slid through the sleeves 55, 53 to allow vertical oscillation of the wheel leg 49.

A stub axle 59 extends laterally of and at the other end of the wheel leg 49, serving as a shaft for the wheel 3 while a nut 61, screwed onto a threaded end of the stub axle 59, prevents the wheel from coming off, the said wheel being then freely rotatable on the stub axle 59.

Oscillation in a vertical plane of the wheel leg 49 and the wheel 3 is obtained by means of a hydraulic or pneumatic power jack of which the cylinder 65 is connected at the upper end to a triangular assembly, to be described hereinbelow, and of which the lower end of the jack rod 67 is pivotally connected to the wheel leg 49 through a transverse tube 69, fixed thereto, inserted between two spaced ears 71 upstanding from the leg 49 and pierced with holes aligned with the bore of the tube 69, a pin 73, slidable through the holes of the ears 71 and the bore of the tube 69 constitues the shaft about which the power jack 65, 67 may pivot relative to the wheel leg 49.

The triangulated assembly, aforementioned, is made up of a pair of braces fixed, at their lower ends to respectively the forward and rearward transverse members 5 of the frame 1 and interconnected at their upper ends.

One of the braces is constituted by a pair of spaced members 75 each having at their lower end a horizontally extending U-shaped bolt 77 straddling the square bar forward transverse member 5 of the frame 1 and of which the threaded ends project forwardly of member 5 to receive a fastening bar 79. Nuts, not shown, are thereafter screwed onto the threaded ends of the U-bolt 77 to hold the relevant brace member 75 upwardly. The other brace 81 of the triangular structure is fixedly secured, at the lower end, to the rearward transverse member 5 by a U-shaped bolt assembly similar to that described with respect to the brace members 75. The other end of the brace 81 branches out into a fork of which the prongs 83 receive, in between, the upper end of a hollow member 85 of the aforementioned telescoping assembly. As shown, the upper ends of the brace members 75, the upper ends of the prongs 83 and the upper end of the hollow member 85 are pivotally interconnected by a bolt and nut assembly 87, 89.

A rod 91 is inserted into the hollow member 85 of the telescoping assembly for free sliding motion therein, having its lower end connected to the wheel leg 49 in the same manner as the lower end of the jack rod 67 so that no further description need be given. Suffice it to say that the lower end of the rod 91 is pivotally mounted at the wheel end of the wheel leg 49.

The upper end of the hollow member 85 is provided with a series of spaced through holes 93, cooperating in pairs so that a lock pin 95 may be inserted into a selected one of the pairs, for a purpose to be determined hereinafter. For the moment, it will be noted that the pairs of holes extend through the two sets of opposing faces of the square member 85 and may for instance be spaced one inch apart. In staggering the holes of one set of opposing faces with respect to the holes of the other set of opposing faces, it is thus possible to place the lock pin 95 selectively at half inch intervals.

An additional pair of holes 97 is provided further down the hollow member 85.

Finally, the upper end of the cylinder 65 of the power jack is connected to and between the two brace members 75 by means of an assembly similar to that connecting the end of the jack rod 67 to the wheel leg 49, i.e., by means of a transverse tube bearing 99 and a bolt and nut assembly 101, 103.

The operation of the wheel mounting assembly just described is as follows.

During transportation on roads or the like when the tilling implements beneath the frame 1 are not in use, the power jack 65 is placed under pressure thereby lifting the frame 1 with respect to the wheels 3 sufficiently so that the tilling implements are safely above the ground. At that moment the lock pin 95 is inserted through the holes 97 of the telescoping assembly. During transportation, should there be a leak of hydraulic fluid in the system feeding the power jack, the latter would then close and the rod 91 would slide upwardly into the hollow member 85 until it would be stopped by the safety pin 95 thus preventing any further falling of the frame. The location of the holes 97 is of course determined to ensure that the tilling implements would, under this condition, be safely above ground so as to avoid damage thereto.

Whenever the cultivator is to be used, the lock pin 95 is withdrawn from the holes 97 and located into a suitable pair of holes 93 corresponding to the depth of cultivation required. Indeed, it will be understood that if again too much pressure is let off the power jack 65, 67, the frame 1 and its tilling implements would then drop to an uncontrollable depth were it not for the lock pin 95 which, as aforesaid, is adjusted to allow only a predetermined drop of the frame and tilling implements corresponding to the desired cultivation depth.

As mentioned previously, a blade 105 is preferably provided, forwardly and at a substantial distance from the forward row of tines 11. As said, this blade allows levelling of the soil and filling of holes, thereby resulting in a saving of fertilizer, herbicide or other chemical composition.

The blade attachment to the frame 1 is best illustrated in FIGS. 1, 3, 6 and 7. With reference to FIGS. 1 and the attachment will be seen to be made up of a support comprising a transverse bar 107 having, fixed near the ends thereof, a pair of longitudinal bars 109 of which the ends opposite bar 107 are pivotally mounted, in any known manner, on the forward transverse member 5 of the frame 1. The support further includes pairs of mounting metal straps 111, 111', solid with bars 107, 109 and projecting forwardly of transverse bar 107. Projecting metal straps 111, 111' are disposed on either side of the flanges of channel shaped brackets 113 of which the back of the web thereof is welded or otherwise secured to the upstanding blade 105. Bolt-and-nut assemblies 115 pivotally mount the said support and the blade 105 together.

Figure 7:
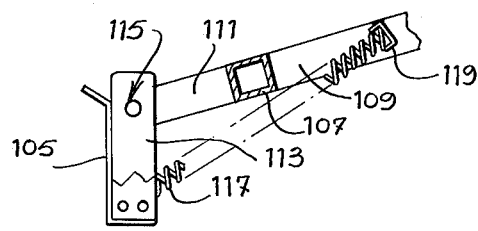
Figure 8:
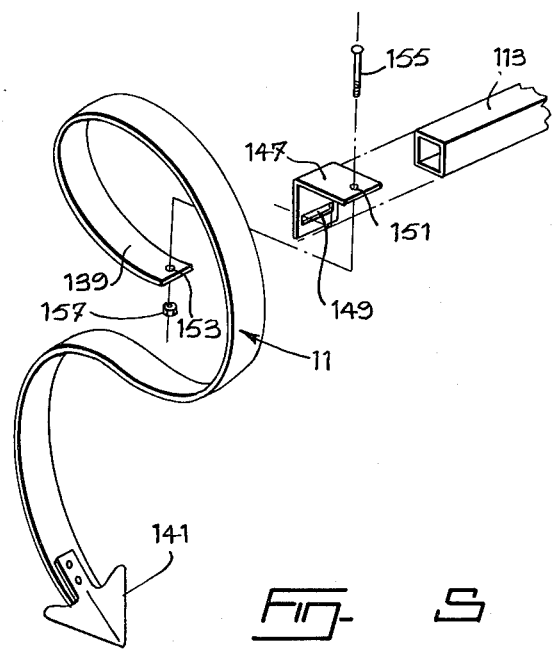

With reference to FIG. 7, it will be seen that compression springs 117, of which the ends are respectively lodged into bucks-like housings 119, 119' at the bottom of the L-shaped blade 105 and along the longitudinal bars 109, serve to hold the blade 105 upright but allow it to tilt rearwardly whenever the blade meets an obstacle which would otherwise damage at least the lower edge of the blade.

The blade 105 and its frame attachment above-described can be lifted off the ground into an inactive position by means of a hydraulic or mechanical power jack 119 whose rod end is pivotally connected in any known manner to the transverse bar 107, at the center thereof, and likewise pivotally connected at the other end to the upper end of a vertically inclined solid post 121 fixedly secured, at the base, to the forward transverse member 5 of the frame 1 (FIG. 3).

The convenient location of the levelling blade 105, at an appreciable distance from the drawing end of the frame 1, makes it possible to efficiently mount the chemical composition spraying assembly with the spraying nozzles 123 (FIG. 2) thereof located immediately forwardly of the forwardmost row of tines 11. I have found that with such an arrangement, the chemical composition not only appropriately wets the soil surface but is immediately incorporated into the soil by the powerful and thorough loosening thereof under the vibrating action of the first tines 11 immediately behind the nozzles 123.

The composition piping system leading to the nozzles 123 is of course of conventional design and need not be described any further here nor is it necessary to give any detailed description of the piping or tubing system feeding the power jacks 65 and 119.

It has been said before that, in known cultivators, the forward tines 11 tend to dig into the ground further than the rearward ones so that the efficiency of tillage is not quite satisfactory. This drawback is avoided, with the cultivator of the present invention, by the following system suitable to level the frame 1, from the rear end to the drawing end thereof, so as to keep it relatively in parallel relationship with the soil being cultivated. The frame levelling system is best illustrated in FIGS. 1 and 2 and is described as follows.

It comprises a drawbar arrangement made up of a pair of pull rods 125 connected together at one end to a hitch member 127 of known type which, itself, is of course to be attached to the hitch device of the tractor. The other ends of the pull rods 125 are connected, in any known manner, to the forward transverse member 5 of the frame 1 for pivotal movement about a horizontal transverse axis 126. Thus, the drawbar arrangement is allowed to oscillate vertically about the said axis 126. The frame levelling system further provides for a tetrahedron structure rising above the drawbar arrangement aforesaid and the frame 1, this tetrahedron structure having a front rod 129 connected at one end to the hitch member 127 and having a pair of rear rods 131 connected at one of their ends to points 133, 133' on the rear end of the frame 1 and on either side thereof. The upper ends of the front and rear rods 129, 131 are pivotally connected together, in any known manner, to form the apex 135 of the tetrahedron structure. It should be added that the lower ends of the rods 129, 133, 133' are pivotally connected, respectively to the hitch member 127 and to the frame 1, for movement about parallel horizontal axes. Finally and as best shown in FIG. 2 this frame levelling assembly further comprises a ratchet jack 137 of known type connected between the apex 135 of the tetrahedron and the forward end transverse member 5 of the frame 1, rearwardly of the pivot axis 126 of the pull rods 125, whereby displacement of the apex 135 with respect to the frame 1 by the ratchet jack 137 causes relevant displacement of the rear end of the frame with respect to the drawing end thereof. More specifically, should there be a tendency for the forward tines 11 to dig deeper into the ground than the rearward tines 11, then the ratchet jack 137 may be operated to draw the apex 135 of the tetrahedron structure closer to the frame 1 thereby applying a downward force at the rear end of the frame 1, through the rear rods 131 to compensate for the increase digging pressure of the forward tines 11.

The ratchet jack 137 itself, as is known, is mainly made up of a central tube having a bore threaded in reverse direction at their ends into which are inserted two likewise threaded rods which are respectively connected to the apex 35 and to the front transverse member 5. Thus, rotation of the central tube by a ratchet lever arrangement causes withdrawal or insertion of the end rods, causing rising or lowering of the apex 135 with respect to the frame 1.

As to the preferred tines to be used with the cultivator of my invention, one is shown in detail in FIG. 5 to which reference is now made. As aforedescribed, there are four rows of such tines being used and, with the particular form hereinafter described, a multi-directional powerful vibrating action is obtained which shatters the soil by breaking down large clods and shaking weed roots loose, leaving them on the surface of the soil. The alternating rolling harrows 13 complement the tine process by levelling and firming the soil, pulverizing the remaining large clods and stripping all remaining soil of weed roots with improved efficiency. The tillage can thus be completed in just one pass, the top layer of soil being tossed into the air by the rolling harrows and settling over the fine particles which nestle next to the moist undisturbed earth. The small clods, because they are thrown higher and further as they leave the rolling harrows, end up on the soil surface, giving the seed bed a remarkable resistance to wind erosion.

The tine illustrated in the present embodiment is, as shown in FIG. 5, a vertically extending flat spring blade having the general configuration of an S with the upper end 139 inwardly curved to nest within the upper arc of the S. The lower end of the spring blade has, secured thereto in any known manner, a share 141 which goes into the soil.

Each tine 11 is mounted at the end of a short transverse bar 143 which, itself, is secured at the middle on a support bar 145 secured at the center, transversely, to a transverse member 5 of the frame 1. There is provided, at the very end of such a bar 143, an angle plate 147 secured thereto with the two flanges lying over two adjacent faces of the square bar 143, the two flanges further extending past the remaining two faces of the square bar 143. The downwardly projecting flange has a rectangular slot 149 while the horizontal flange has a hole 151, both through the extensions of the flanges. To mount a tine 11 to such a rod 143, the upper end 139 of the tine is slid through the slot 149 until a hole 153 at the end thereof vertically aligns with the hole 151 of the horizontal flange of the angle member 147. Thereafter, the upper end 139 of the tine is secured to the rod 143 by means of a nut-and-bolt assembly 155, 157.

In the aforedescribed manner, the tines are solely secured at their upper end and completely free thereafter to oscillate both vertically and laterally thereby providing a strong vibrating action capable of efficiently loosening the soil.

In the above description, reference has only be made to a cultivator having a single frame mounted on a single pair of wheels. It should be noted however that the invention can also be applied to cultivators having a plurality of frames connected to each other generally in a transverse line, and to cultivators having one or more frames mounted on tandem wheels.

Reference has also be made to a cultivator having one single row of harrows under the middle of its frame and two rows of harrows at the rear thereof. It should be noted however that in accordance with the invention, other kinds of cultivators having a different number of harrows or rows of harrows in the middle or at the rear of the frame could also be provided, with a variable number of arms of holding the harrows.

I claim:
1. In a cultivator of the type including:
   a frame, said frame having a drawing end and a rear end;
   a single pair of wheels rotatable about an axis extending transversely of said frame with respect to the direction of displacement of the cultivator;
   at least one transverse row of tines mounted on the frame forwardly of the wheel axis;
   at least one other transverse row of tines rearwardly of the wheel axis;
   at least one transverse cylindrical rolling harrow;
   means for mounting said rolling harrow on said frame at said rear end thereof behind the rearward row of tines for oscillation about an axis parallel to the longitudinal axis of said rear harrow; and,
   means for resiliently biasing said rear harrow downwardly, the improvement comprising:
   said frame having a pair of parallel cross-members disposed on either side of the wheel axis and at least two longitudinal members joining said cross-members; and
   mounting means along either side of said frame for mounting said wheels onto said frame, said mounting means being comprised of:
   a wheel leg pivotally mounted at one end to said frame for oscillation in a vertical plane beneath said frame;
   axle means at the other end of said wheel leg for mounting one of said wheels thereon, said wheel mounted on said axle means being freely rotatable about its axis, a plurality of braces, each brace being connected to the other at one end thereof and each brace being connected at the other end thereof to one of said cross-members, whereby a vertically extending triangular structure is formed, power jack means connecting one of said braces to said wheel leg for oscillating said wheel leg, whereby said wheel and frame are displaced relative to each other, and an upwardly extending telescoping assembly means connecting said braces and said wheel leg for controlling the vertical position of said frame and thereby the cultivation depth of said cultivator, said assembly comprising:

a hollow tubular member have a series of holes therethrough at one end, said holes being spaced in pairs therealong, a rod freely slidable within said hollow tubular member, a lock pin removably extending through a selected one of said pairs of holes, whereby said rod is prevented from sliding in said tubular member past said lock pin, first connecting means for connecting the upper end of said hollow tubular member to the apex of said vertically extending triangular structure, and second connecting means at the lower end of said rod for connecting said rod to said wheel leg, whereby upon release of pressure in from said power jack means and the consequent lowering of said frame, said rod rises in said hollow member until it butts against said lock pin and thus prevents further downward movement of said frame, whereby the depth of tillage of said cultivator is controlled.

2. An improvement as claimed in claim 1, further comprising:

at least one additional transverse cylindrical rolling harrow;

means for mounting said additional harrow on said frame between said forward and rearward rows of tines for vertical oscillation about an axis parallel to the longitudinal axis of said additional harrow; and biasing means connected to said additional harrow for resiliently biasing said additional harrow downwardly.

3. An improved cultivator as claimed in claim 2, wherein each of said means for mounting said harrows on said frame is a support assembly comprising: an arm extending parallel to said direction of displacement; means mounting one end of said arm to said frame for pivotal movement about a transverse axis; means mounting the respective harrow to the other end of said arm for free rotation thereof about its longitudinal axis, and resilient means biasing said arm downwardly with respect to said frame.

4. An improved cultivator as claimed in claim 3, wherein said resilient means is a strength-adjustable spring fixed at the ends thereof respectively to said frame and to the other end of said arm so as to force the said arm downwardly.

5. An improved cultivator as claimed in claim 4, said support assemblies further comprising stop means limiting the downward descent of said arms.

6. An improved cultivator as claimed in claims 1, 3 or 4, wherein there are two forward transverse rows of tines, the tines of one row being staggered with respect to the tines of the other row, and wherein there are two rear rows of tines, the tines of one row being staggered with respect to the tines of the other row.

7. An improved cultivator as claimed in claim 1, further including an additional pair of safety holes through said hollow member located at a distance from said first-mentioned pairs of holes away from said apex, for use to prevent falling of said frame below a predetermined point when the latter is raised relative to said wheels, said tines and rolling harrows being then in an inactive raised position.

8. An improved cultivator as claimed in claim 1, further comprising a soil levelling blade extending transversely with respect to said direction of movement of said frame; attachment means for connecting said blade to and forwardly of the drawing end of said frame, said attachment means including resilient means allowing the blade ground-contacting edge to tilt backwardly; and, power jack means for lowering and raising said blade to active and inactive positions.

9. An improved cultivator as claimed in claim 1, further comprising means for spraying a liquid solution on the soil being tilled, said means including a plurality of nozzles mounted immediately forward of said forward row of tines.

10. An improved cultivator as claimed in claim 1, wherein each tine is a downwardly extending S-shaped spring tine solely secured, at the upper end, to the frame thereby allowing multi-directional vibration thereof as said cultivator is displaced over the soil for means.

11. An improved cultivator as claimed in claim 1, further comprising levelling means for levelling said frame from said rear end to said drawing end thereof, said levelling means being comprised of:

a draw bar arrangement adapted to be connected at a first end thereof to a pulling means and pivotally connected at a second end thereof to the drawing end of said frame;

a tetrahedron structure rising above said draw bar arrangement and said frame, said tetrahedron structure having a front rod connected at one end to said first end of said draw bar arrangement;

a pair of rear rods connected at one end to points on said frame at the rear end thereof, said rear bars being transversely spaced apart;

means connecting the other ends of said front and rear rods together to form the apex of said tetrahedron structure; and jack means connected between said apex of said tetrahedron structure and the forward end of said frame whereby displacement of said apex with respect to said frame by said jack means causes relevant displacement of the rear end of said frame with respect to said frame drawing end.

12. An improved cultivator as claimed in claim 11, wherein said draw bar arrangement comprises a pair of pull rods connected to each other at one end and pivotally connected at the other end thereof to transversely spaced apart points of said frame drawing end.

13. An improved cultivator as claimed in claim 11, wherein each tine is a downwardly extending S-shaped spring tine solely secured, at the upper end, to the frame thereby allowing multidirectional vibration thereof as said cultivator is displaced over the soil for cultivation.

* * * * *